(12) United States Patent
Sharon et al.

(10) Patent No.: US 12,657,093 B2
(45) Date of Patent: Jun. 16, 2026

(54) DATA STORAGE DEVICE AND METHOD FOR REUSING A HARDWARE ENCODER IN A RAID RECOVERY OPERATION

(71) Applicant: Sandisk Technologies, Inc., Milpitas, CA (US)

(72) Inventors: Eran Sharon, Rishon Lezion (IL); Ran Zamir, Ramat Gan (IL); Idan Goldenberg, Ramat Hasharon (IL); Ishai Ilani, Dolev (IL); Alexander Bazarsky, Holon (IL)

(73) Assignee: Sandisk Technologies, Inc., Milpitas, CA (US)

( * ) Notice: Subject to any disclaimer, the term of this patent is extended or adjusted under 35 U.S.C. 154(b) by 194 days.

(21) Appl. No.: 18/791,815

(22) Filed: Aug. 1, 2024

(65) Prior Publication Data

US 2026/0037390 A1 Feb. 5, 2026

(51) Int. Cl.
*G06F 11/1446* (2026.01)
*G06F 3/06* (2006.01)

(52) U.S. Cl.
CPC ........ *G06F 11/1469* (2013.01); *G06F 3/0604* (2013.01); *G06F 3/0652* (2013.01); *G06F 3/0689* (2013.01); *G06F 2201/805* (2013.01)

(58) Field of Classification Search
CPC .. G06F 11/1469; G06F 3/0604; G06F 3/0652; G06F 3/0689; G06F 2201/805
USPC ................. 714/770, 763, 764, 784, 785, 799
See application file for complete search history.

(56) References Cited

U.S. PATENT DOCUMENTS

| | | | |
|---|---|---|---|
| 7,487,394 B2 | 2/2009 | Forhan et al. | |
| 8,484,533 B2 | 7/2013 | Olbrich et al. | |
| 8,977,813 B2 | 3/2015 | Burd | |
| 9,940,194 B2 * | 4/2018 | Achtenberg | ........ G06F 11/1012 |
| 9,959,168 B2 | 5/2018 | Achtenberg et al. | |
| 9,984,771 B2 | 5/2018 | Bonke | |
| 10,198,315 B2 | 2/2019 | Sharon et al. | |
| 10,275,311 B2 | 4/2019 | Kim et al. | |
| 10,536,172 B2 | 1/2020 | Ilani et al. | |
| 10,649,867 B2 | 5/2020 | Roberts et al. | |
| 11,714,767 B1 * | 8/2023 | Goldstein | ............... G06F 3/064 710/1 |
| 2017/0220410 A1 * | 8/2017 | Kim | ...................... G06F 11/108 |

(Continued)

FOREIGN PATENT DOCUMENTS

WO WO 2023/184921 10/2023

OTHER PUBLICATIONS

Gilroy et al., RAID 6 Hardware Acceleration, 2006, IEEE. pp. 1-6. (Year: 2006).*

(Continued)

*Primary Examiner* — John J Tabone, Jr.
(74) *Attorney, Agent, or Firm* — Crowell & Moring LLP

(57) ABSTRACT

A Redundant Array of Independent Disks (RAID) scheme can be used to allow recovery from a memory failure. RAID 6 can be used to recover data from up to two catastrophic failures. Typically, a hardware encoder is used to generate parities of the RAID 6 protection scheme, and a separate hardware decoder is used in the data recovery process. In an example data storage device described herein, some of the components of the hardware encoder are used to perform the data recovery process, thereby eliminating the need for a separate, additional hardware component.

20 Claims, 8 Drawing Sheets

(56) References Cited

U.S. PATENT DOCUMENTS

| | | | |
|---|---|---|---|
| 2018/0032395 A1* | 2/2018 | Yang ................... | H03M 13/154 |
| 2026/0037390 A1* | 2/2026 | Sharon ................ | G06F 11/1469 |

OTHER PUBLICATIONS

A12 Chen et al.; "RAIDq: A software-friendly, multiple-parity RAID"; In 5th USENIX Workshop on Hot Topics in Storage and File Systems (HotStorage 13); 2013; 5 pages.

* cited by examiner

710 Define a generic RAID encoder that can calculate $C' = C + \alpha^i \cdot x$ 720 Calculate the syndrome using the encoding hardware 730 Calculate the powers of alpha in the inverse of $A(i',j',k')$ 740 Calculate the erased symbols by reusing the encoding circuit

DATA STORAGE DEVICE AND METHOD FOR REUSING A HARDWARE ENCODER IN A RAID RECOVERY OPERATION

BACKGROUND

In enterprise storage systems, data integrity is one of the most important requirements, demanding extremely-low probabilities for occurrences of undetected data corruption. There are many potential causes for data corruption, such as NAND defects, bus failures, cosmic radiation, firmware bugs, etc. In order to deal with memory plane or die-level defects, RAID (Redundant Array of Independent Disks) schemes can be used that allow recovery from severe catastrophic failures, such as memory die or plane failure. Currently, the most-common RAID scheme is RAID 5, which can protect against a single failure. However, some enterprise applications have stricter reliability requirements, requiring protection against two failures. In this case, RAID 6 can be used, which can recover data from up to two catastrophic failures.

DETAILED DESCRIPTION

The following embodiments generally relate to a data storage device and method for reusing a hardware encoder in a RAID recovery operation. In one embodiment, a data storage device is provided comprising a memory, a hardware encoder, and one or more processors. The hardware encoder is configured to generate p and q parities of a Redundant Array of Independent Disks (RAID) 6 protection scheme. The one or more processors, individually or in combination, are configured to reuse a subset of components of the hardware encoder to perform a data recovery operation.

In another embodiment, a method is provided that is performed in a data storage device comprising a memory and encoding hardware configured to calculate $C=C+\alpha^i \cdot x$. The method comprises: calculating a syndrome using the encoding hardware, which is a first stage of a Redundant Array of Independent Disks (RAID) 6 recovery operation; calculating powers of alpha in an inverse of $A(i',j',k')$ using the encoding hardware; and calculating erased symbols by reusing only some components of the encoding hardware.

In yet another embodiment, a data storage device is provided comprising: a memory; a hardware encoder configured to generate p and q parities of a Redundant Array of Independent Disks (RAID) 6 protection scheme; and means for reusing a subset of components of the hardware encoder to perform a data recovery operation.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figures 1A, 1B, 1C:
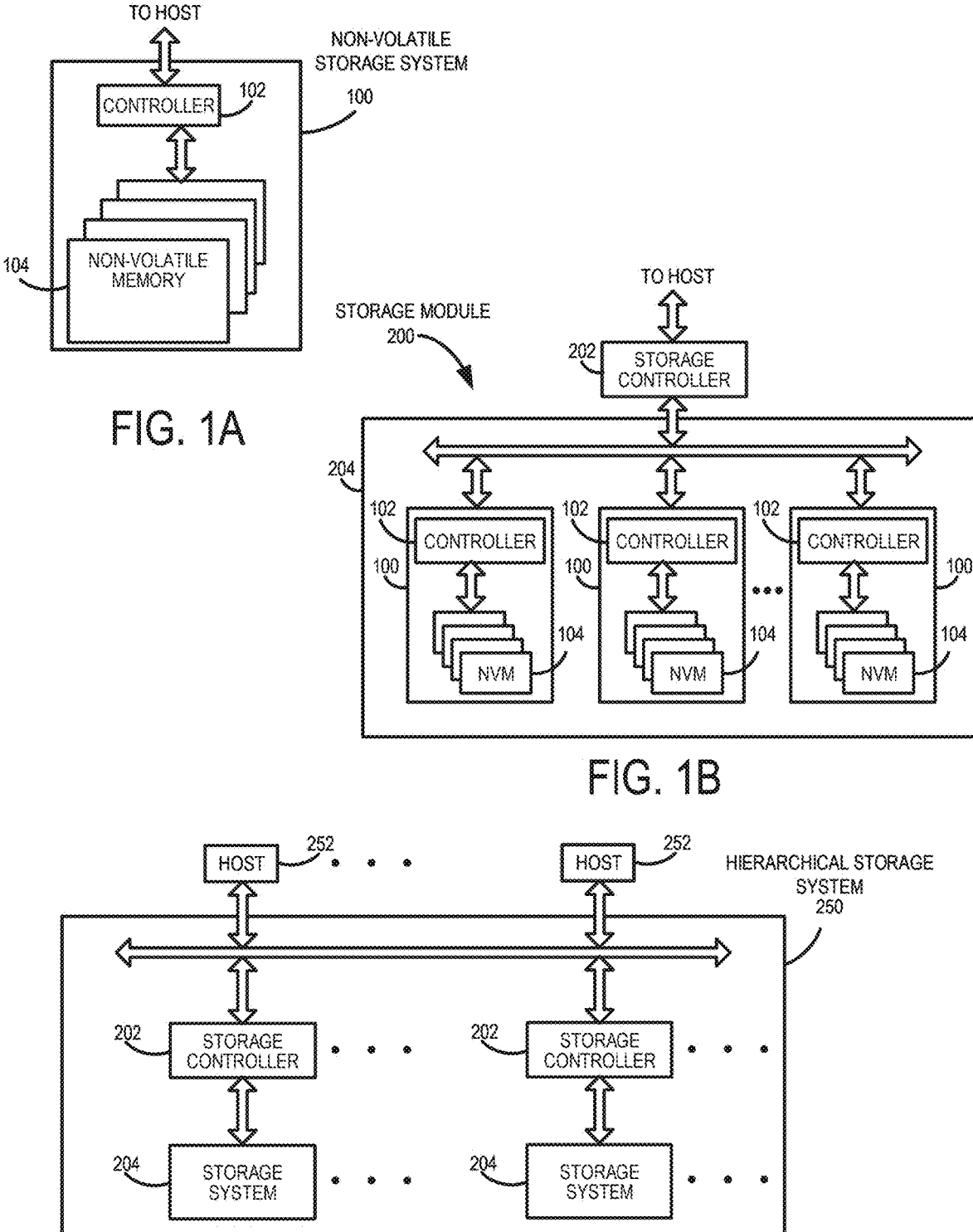
FIG. 1A is a block diagram of a data storage device of an embodiment.
FIG. 1B is a block diagram illustrating a storage module of an embodiment.
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
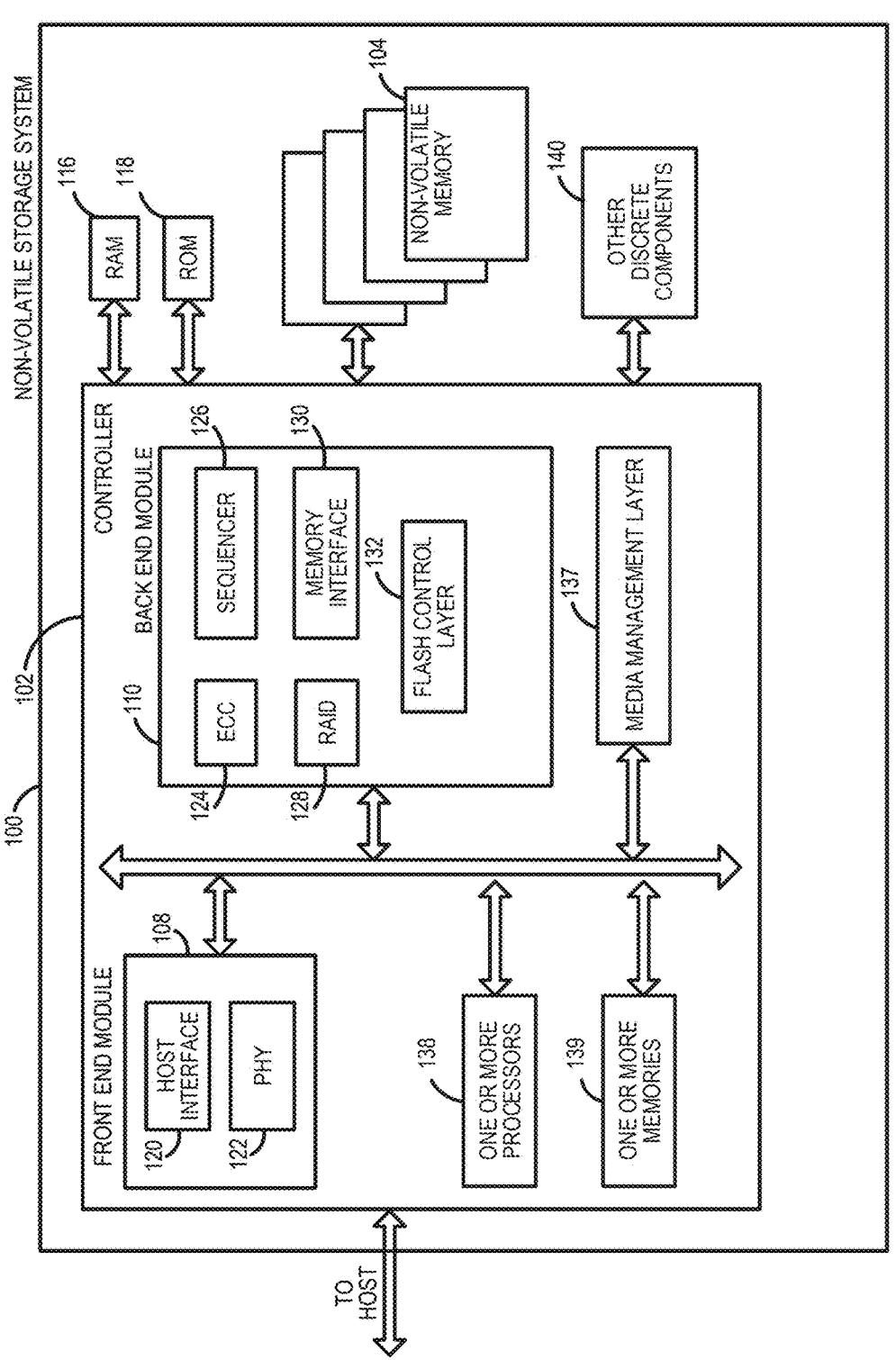
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
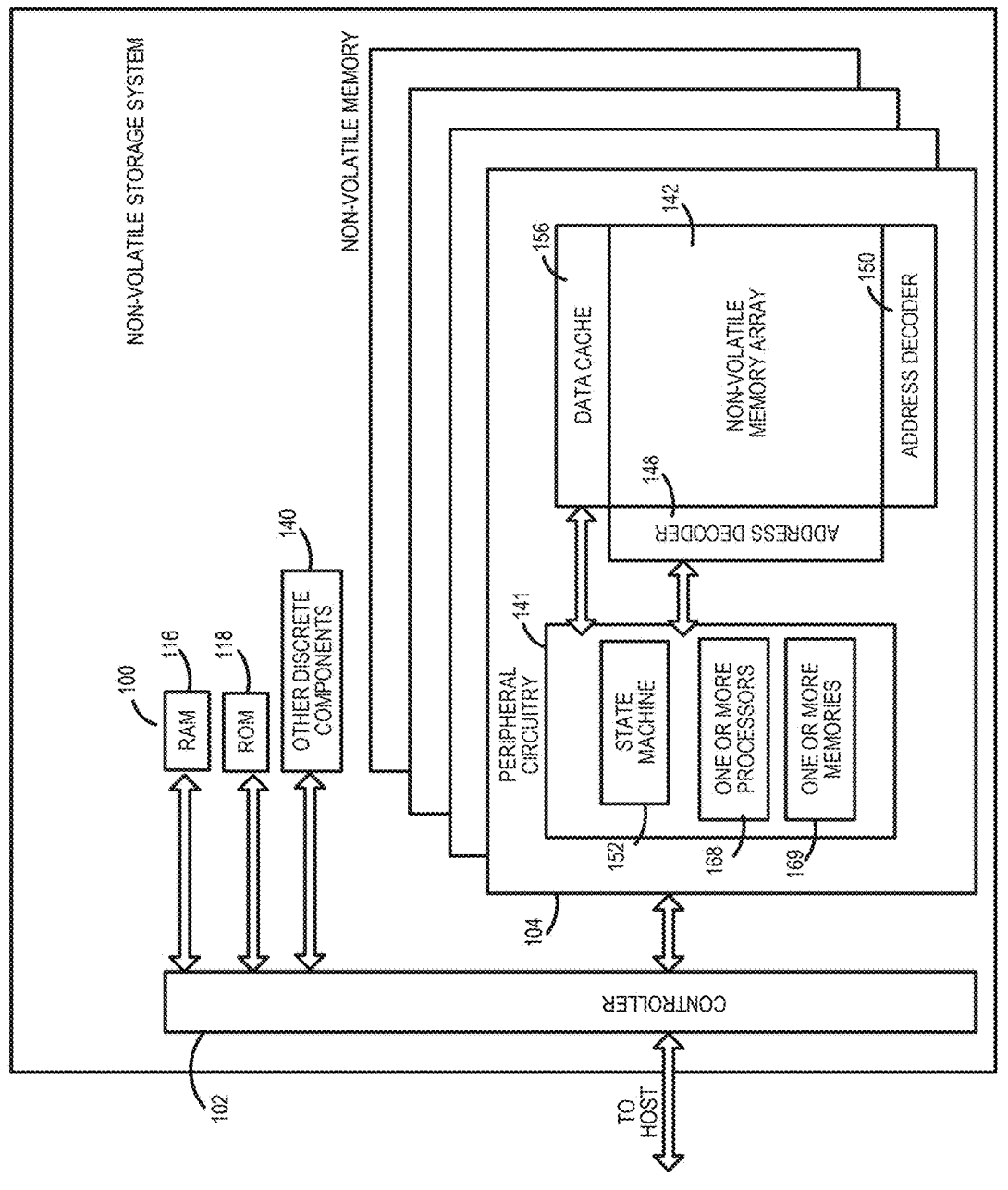
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
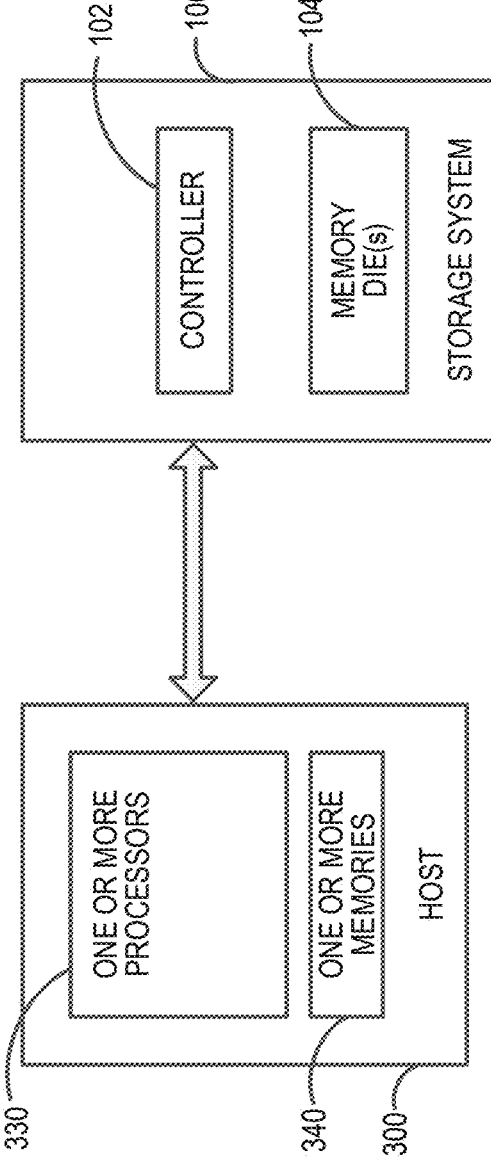
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

Figure 4:
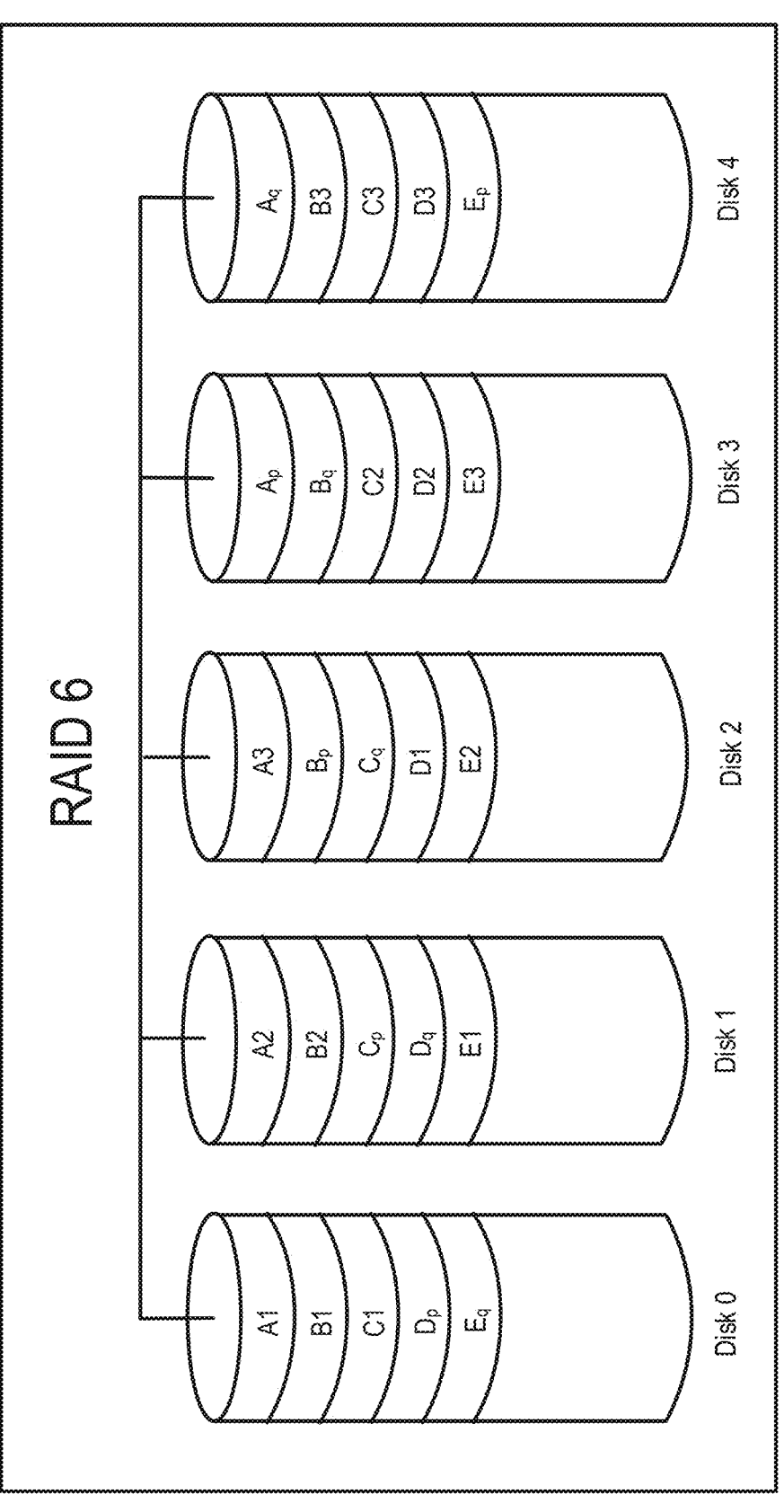
FIG. 4 is an illustration of a RAID (Redundant Array of Independent Disks) 6 protection scheme of an embodiment.

As mentioned above, in enterprise storage systems, data integrity is one of the most important requirements, demanding extremely-low probabilities for occurrences of undetected data corruption. There are many potential causes for data corruption, such as NAND defects, bus failures, cosmic radiation, firmware bugs, etc. In order to deal with memory plane or die-level defects, RAID (Redundant Array of Independent Disks) schemes can be used that allow recovery from severe catastrophic failures, such as memory die or plane failure. Currently, the most-common RAID scheme is RAID 5, which can protect against a single failure. Encoding/decoding in RAID 5 is relatively simple as it only requires an exclusive-or (XOR) operation between the protected dies. However, some enterprise applications have stricter reliability requirements, requiring protection against two failures. In this case, RAID 6 can be used, which can recover data from up to two catastrophic failures. FIG. 4 is an illustration of an example RAID 6 protection scheme. In this illustration, there are three data disks (e.g., memory dies) and two additional disks (marked with "p" and "q" subscripts) that are required for the RAID 6 parity. This RAID 6 setup is identical to a RAID 5 setup other than the addition of the second parity block.

The RAID 6 scheme is based on a Reed-Solomon (RS) code that includes two parity symbols for every codeword and can correct any two failures in the codeword. The RAID 6 encoding process includes calculating the P, Q parities according to:

$$\begin{cases} P = x_0 \oplus x_1 \oplus x_2 \oplus \dots \oplus x_{q-1} \\ Q = x_0 \oplus \alpha x_1 \oplus \alpha^2 x_2 \oplus \dots \oplus \alpha^{q-1} x_{q-1} \end{cases}$$

The P-parity is a simple XOR operation between the data symbols (marked as $x_i$). The Q-parity is calculated by XORing data symbols multiplied by different powers of a primitive field element $\alpha$, which constitutes the codebook of the Reed-Solomon code. Note that all operations are performed at a symbol level but are applied to each symbol within the protected unit (which can be die, plane, block, page, etc.) The symbol size depends on the field over which the Reed-Solomon code is defined. For example, an RS code over GF (2^8) will use 8-bit symbols (i.e., each symbol is a byte). Such RS code can support a RAID stripe size of 254 data symbols.

Figure 5:
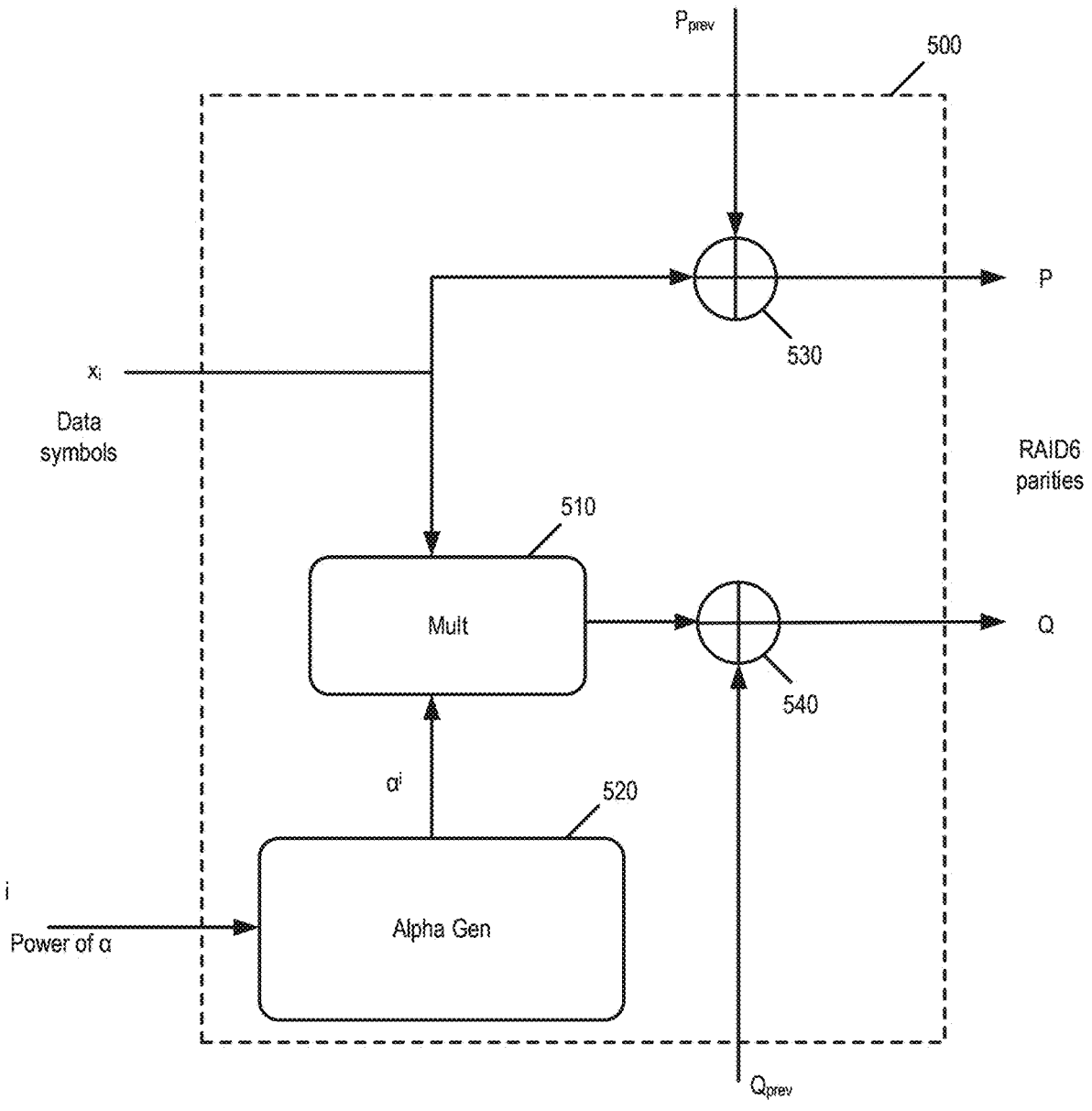
FIG. 5 is an illustration of a RAID 6 encoder of an embodiment.

The encoding process works at the device data rate and, therefore, may be preferably performed with dedicated hardware to meet the write performance requirements of the data storage device 100. The P, Q parities can be saved on redundant dies added to the data storage device 100 for this purpose. FIG. 5 is an illustration of a RAID 6 encoder 500 of an embodiment. As shown in FIG. 5, the RAID 6 encoder 500 of this embodiment comprises a multiplier 510, an alpha generator 520, and adders 520, 530. In general, this RAID 6 encoder 500 accepts data symbols, i power of alpha, and previous P and Q values as inputs and outputs new P and Q RAID 6 parities. The multiplier 510 multiplies two field elements, input symbol x_i by the field element alpha^i. The multiplier can be implemented as a multiplication of an n×n binary matrix representing the element alpha^i by a binary n×1 vector the field element x_i, where 2^n is the size of the field over which the RS code is defined. E.g. if the RAID6 scheme is defined over GF (2^8=256), then the multiplier implements a multiplication by a 8×8 binary matrix of alpha^i by a 8×1 binary vector of x_i. The field element alpha^i, or more specifically it n×n binary matrix in a preferred embodiment, is generated by the alpha generator 520, as a function of the power index i. This may be done by storing the 2^n binary n×n matrices, one for each power i. In another embodiment, it can also be performed by storing only n binary n×n matrices of the powers alpha, alpha^2,alpha^4, . . . , alpha^n and then generating alpha^i by multiplying the relevant matrices out of the n stored matrices according to the binary representation of i. This incurs some latency for the alpha generation block (of up to n processing clocks for multiplying up to n matrices in the alpha^I matrix generation). In one efficient embodiment, the alpha generation can be implemented by storing n×2^n matrix and outputting the relevant n columns as a function of the power index i.

In this embodiment, RAID 6 decoding (recovery) has three stages, where it is assumed that the failures are at indices i, j. In the following examples, it is assumed that RAID 6 protects against memory die failures. However, these embodiments can be applied to any suitable memory unit (e.g., page, word, block, plane, etc.). First, the syndrome of the error is calculated. This is identical to the encoding but skips the failed dies/planes.

$$\begin{cases} S_P = x_0 \oplus x_1 \oplus x_2 \oplus \ldots \oplus x_{q-1} \\ \qquad\qquad\qquad\qquad\qquad \text{skipping indices } i, j \\ S_Q = x_0 \oplus \alpha x_1 \oplus \alpha^2 x_2 \oplus \ldots \oplus \alpha^{q-1} x_{q-1} \end{cases}$$

The operations are performed at the symbol level (e.g. Byte level), but are applied to each symbol in the die (or protected memory unit).

Next, matrix inversion is performed. The syndrome acquired from stage 1 satisfies:

$$\begin{bmatrix} S_P \\ S_Q \end{bmatrix} = \begin{bmatrix} 1 & 1 \\ \alpha^i & \alpha^j \end{bmatrix} \begin{pmatrix} x_i \\ x_j \end{pmatrix}$$

So, to recover $(x_i, x_j)$, the matrix A needs to be inversed:

$$A = \begin{bmatrix} 1 & 1 \\ \alpha^i & \alpha^j \end{bmatrix} \quad (*)$$

Note: there are special cases where the failures are in the parities P, Q. In this case, the matrix is A slightly different:

In case one of the failures is $$P\!:\!A = \begin{bmatrix} 1 & 1 \\ \alpha^i & 0 \end{bmatrix} \quad (**)$$

In case one of the failures is $$Q\!:\!A = \begin{bmatrix} 1 & 0 \\ \alpha^i & 1 \end{bmatrix} \quad (***)$$

If both failures are on P, Q, then all data symbols are correct, and the recovery is trivial, as a simple encoding operation can recalculate P, Q.

For data recovery:

$$\begin{pmatrix} x_i \\ x_j \end{pmatrix} = \begin{bmatrix} 1 & 1 \\ \alpha^i & \alpha^j \end{bmatrix}^{-1} \begin{bmatrix} S_P \\ S_Q \end{bmatrix}$$

This requires multiplication of the syndrome data with $A^{-1}$. This operation is performed for each symbol within the syndrome and each syndrome is the size of a full die, so this is an extensive data operation.

As can be seen from the above, the first stage of recovery can be done by reusing the encoding hardware as it is almost identical. However, stages 2 and 3 may be done in firmware or software as the recovery operation is typically performed only rarely. However, these are extensive operations and doing them in software may have very high latency, degrading the quality of service (QoS) of the data storage device 100. So, in other cases, dedicated hardware for these steps may be added.

The following embodiment provides a hybrid recovery scheme that reuses the encoding hardware, allowing for RAID 6 recovery with hardware-like high performance with no additional silicon cost. In this way, an efficient RAID 6 decoding (recovery) implementation is provided by reusing some of the hardware used in the encoding process.

First, it is noted that the inverse of A calculated in stage 2 may be rewritten as:

$$A^{-1} = \begin{pmatrix} 1 & 1 \\ \alpha^i & \alpha^j \end{pmatrix}^{-1} = \begin{pmatrix} \alpha^j & 1 \\ \alpha^i & 1 \end{pmatrix} \cdot \alpha^{k'} = \begin{pmatrix} \alpha^{j'} & \alpha^{k'} \\ \alpha^{i'} & \alpha^{k'} \end{pmatrix}$$

Where k satisfies: $\alpha^j - \alpha^i = \alpha^k$ and k'=M−1−k, j'=j−k mod M−1, and i'=i−k mod M−1. M is the field size of the Reed-Solomon codes (e.g., M=2^8=256).

The index k can be calculated by firmware with the help of look-up tables (LUTs) between Cartesian representation and exponent representation of a field element (k=log $(\alpha^j - \alpha^i)$. Once k is calculated, the indices i', j', k' can be calculated using simple arithmetic operations via firmware. This means that each of the elements of $A^{-1}$ are powers of the matrix α and can be directly generated by the alpha generator 520 of the encoder 500, which can generate powers of the matrix α and is an element of the RAID 6 encoder 500 in FIG. 5.

Now looking at the final stage:

$$\begin{pmatrix} x_i \\ x_j \end{pmatrix} = \begin{bmatrix} 1 & 1 \\ \alpha^i & \alpha^j \end{bmatrix}^{-1} \begin{bmatrix} S_P \\ S_Q \end{bmatrix} = \begin{pmatrix} \alpha^{j'} & \alpha^{k'} \\ \alpha^{i'} & \alpha^{k'} \end{pmatrix} \begin{bmatrix} S_P \\ S_Q \end{bmatrix}$$

It is noted that this calculation uses multiplication and addition of symbols with powers of $\alpha$: $\alpha^{i'}$, $\alpha^{j'}$, $\alpha^{k'}$. This calculation circuit already exists in the hardware encoder 500 in FIG. 5. It is also noted that for the special cases () and (*) where the failures are on the parity symbols, matrix A has an even simpler form. and $A^{-1}$ may be calculated in the same way above with slight variations.

Figure 6:
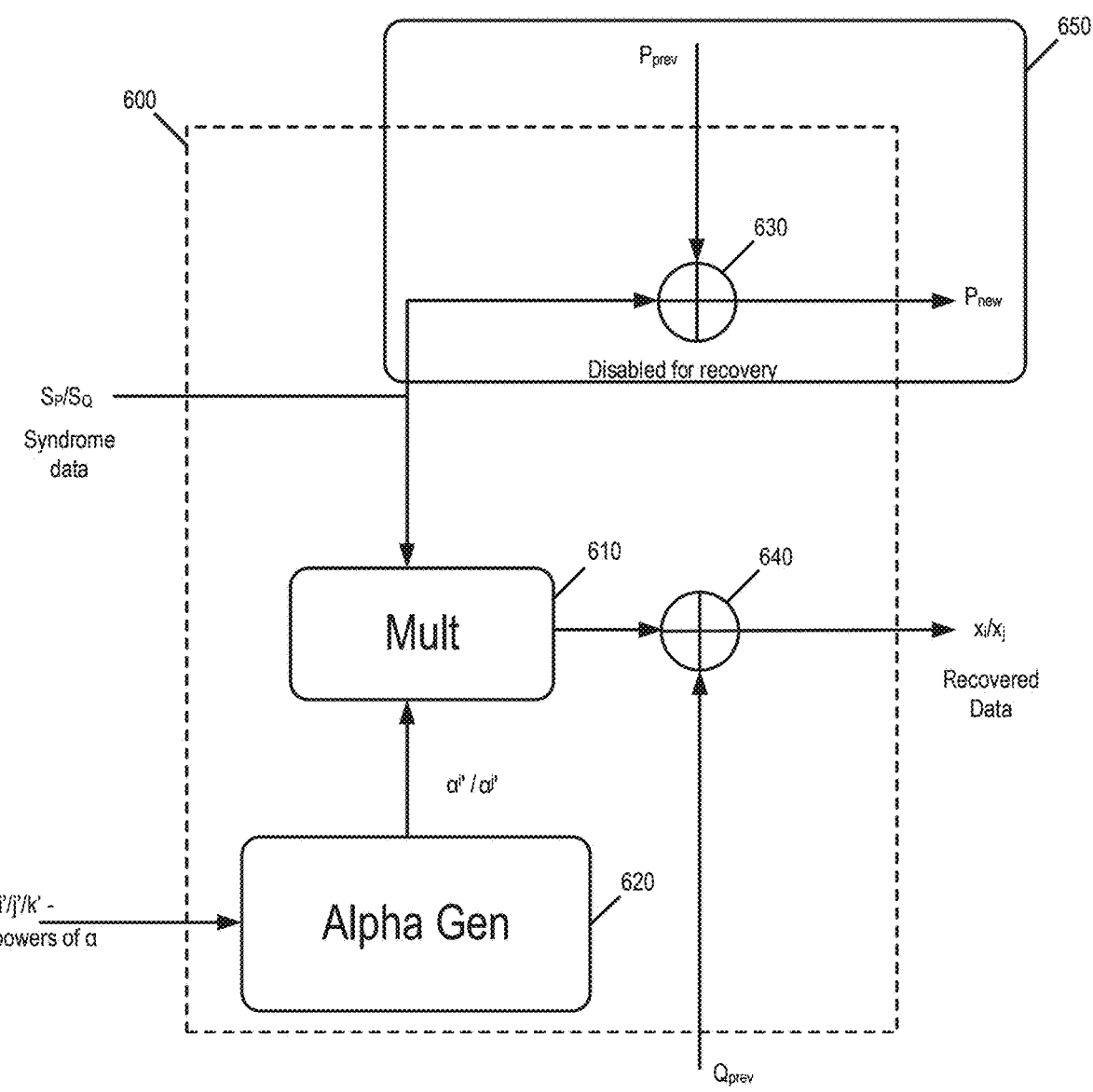
FIG. 6 is an illustration of a RAID 6 encoder of an embodiment that can be reused for recovery.

FIG. 6 is an illustration of a RAID 6 encoder 600 of an embodiment that can be reused for recovery. This encoder 600 is the same as the encoder 500 in FIG. 5 in that it contains a multiplier 610, an alpha generator 620, and adders 620, 630, but adder 630 is disabled for the recovery operation The encoder module 600 may be operated three times to implement the final stage formula of the recovery as follows:

$$D = \alpha^{k'} \cdot s_Q \quad \text{Inputs} = \{s_Q, Q_{prev} = 0, k'\} \qquad 1)$$

$$x_i = D + \alpha^{j'} \cdot s_P \quad \text{Inputs} = \{s_P, Q_{prev} = D, j'\} \qquad 2)$$

$$x_j = D + \alpha^{i'} \cdot s_p \quad \text{Inputs} = \{s_p, Q_{prev} = D, i'\} \qquad 3)$$

Figure 7:
FIG. 7 is a flow chart of a RAID 6 recovery method of an embodiment.
Figure 7:
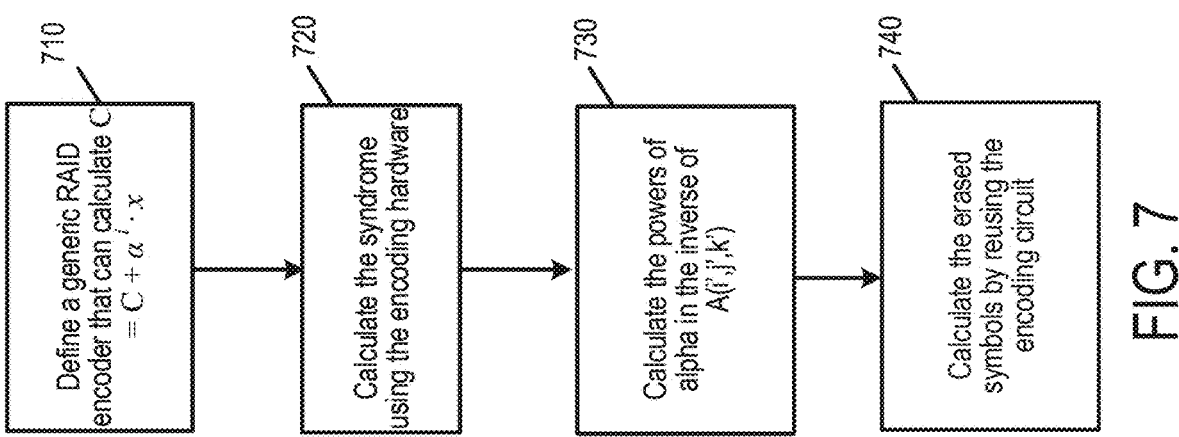

To summarize, these embodiments formulate the recovery operation in terms of multiplication with powers of a in a way similar to the encoder and can implement the recovery calculations through repeated operations of the RAID 6 encoder. FIG. 7 is a flow chart 700 that summarizes an example RAID 6 recovery method. As shown in FIG. 7, a generic RAID encoder is defined that can calculate C=C+ $\alpha^i \cdot x$ (710), as explained above with reference to FIG. 4 and the RAID 6 encoding method. The next steps are performed during the recovery process. First, syndrome is calculated using encoding hardware, which is stage 1 of RAID 6 recovery (720). Next, the powers of alpha are calculated in the inverse of A (i',j',k'), which is explained in the final stage formula above (730). Finally, the erased symbols are calculated by reusing the encoding circuit, which is explained in FIG. 5 above (740). In one embodiment, the power profile of a RAID 6 encoder operation is identified via a logic analyzer. Then, during a recovery operation (e.g., for two corrupted pages of data in an XOR stripe), N+1 activations of the RAID 6 encoder are detected: N−2 activations for stage 1 of the recovery and an additional three activations for stage 3, where N is the length of the XOR stripe.

There are several advantages associated with these embodiments. For example, these embodiments provide hardware-like recovery performance that manifests as significantly-reduced recovery latency (QoS) with no additional silicon cost and hardware development time for recovery circuits.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/ or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention.

Finally, it should be noted that any aspect of any of the embodiments described herein can be used alone or in combination with one another.

What is claimed is:

1. A data storage device comprising:
a memory;
a hardware encoder coupled with the memory and configured to generate p and q parities of a Redundant Array of Independent Disks (RAID) 6 protection scheme; and
one or more processors coupled with the memory, wherein the one or more processors, individually or in combination, are configured to reuse a subset of components of the hardware encoder to perform a data recovery operation.

2. The data storage device of claim 1, wherein the hardware encoder comprises a multiplier, an alpha generator, and/or an adder.

3. The data storage device of claim 1, wherein the subset of components of the hardware encoder that are reused to perform the data recovery operation comprises a multiplier, an alpha generator, and/or an adder.

4. The data storage device of claim 1, wherein the hardware encoder is configured to perform a first stage of the data recovery operation, wherein firmware is configured to perform a second stage of the data recovery operation, and wherein a combination of hardware and firmware is configured to perform a third stage of the data recovery operation.

5. The data storage device of claim 1, wherein the hardware encoder is further configured to calculate $C=C+ \alpha^i \cdot x$, wherein C is an encoded output.

6. The data storage device of claim 1, wherein the hardware encoder is further configured to calculate a syndrome.

7. The data storage device of claim 1, wherein the hardware encoder is further configured to calculate powers of alpha in an inverse of A (i',j',k').

8. The data storage device of claim 1, wherein the hardware encoder is further configured to calculate erased symbols by reusing only some components of the hardware encoder.

9. The data storage device of claim 1, wherein the RAID 6 protection scheme is based on a Reed-Solomon (RS) code that includes two parity symbols for every codeword and can correct any two failures in the codeword.

10. The data storage device of claim 1, wherein the memory comprises a plurality of memory dies.

11. The data storage device of claim 10, wherein the one or more processors, individually or in combination, are further configured to store the p and q parities on redundant ones of the plurality of memory dies.

12. The data storage device of claim 1, wherein the memory comprises a three-dimensional memory.

13. In a data storage device comprising a memory and encoding hardware, a method comprising:
calculating a syndrome using the encoding hardware, which is a first stage of a Redundant Array of Independent Disks (RAID) 6 recovery operation;
calculating powers of alpha in an inverse of A (i'j',k') using the encoding hardware; and
calculating erased symbols by reusing only some components of the encoding hardware.

14. The method of claim 13, wherein the encoding hardware comprises a multiplier, an alpha generator, and/or an adder.

15. The method of claim 13, wherein a multiplier, a generator, and/or an adder are reused to calculate the erased symbols.

16. The method of claim 13, further comprising using software to perform second and third stages of the RAID 6 recovery operation.

17. The method of claim 13, wherein the memory comprises a plurality of memory dies.

18. The method of claim 17, further comprising storing p and q parities on redundant ones of the plurality of memory dies.

19. The method of claim 13, wherein the memory comprises a three-dimensional memory.

20. A data storage device comprising:

a memory;

a hardware encoder configured to generate p and q parities of a Redundant Array of Independent Disks (RAID) 6 protection scheme; and means for reusing a subset of components of the hardware encoder to perform a data recovery operation.

\* \* \* \* \*